United States Patent
Van Gaalen et al.

(10) Patent No.: US 6,388,024 B1
(45) Date of Patent: May 14, 2002

(54) ACID FUNCTIONAL AND EPOXY FUNCTIONAL POLYESTER RESINS

(76) Inventors: Ronald Petrus Clemens Van Gaalen; Petrus Gerardus Kooijmans; Leo Wim Van Noort, all of Badhuisweg 3, CM Amsterdam (NL)

( * ) Notice: Subject to any disclaimer, the term of this patent is extended or adjusted under 35 U.S.C. 154(b) by 0 days.

(21) Appl. No.: 09/696,577

(22) Filed: Oct. 25, 2000

(30) Foreign Application Priority Data

| Oct. 29, 1999 | (EP) | ............................................ | 99203584 |
| Nov. 4, 1999 | (EP) | ............................................ | 99203655 |

(51) Int. Cl.$^7$ .............................................. C08F 20/00
(52) U.S. Cl. ........................ 525/438; 528/297; 528/300; 528/302; 528/307; 528/308; 528/361; 525/437; 525/444; 525/450; 525/934
(58) Field of Search .................................. 528/297, 300, 528/302, 307, 308, 361; 525/437, 438, 444, 450, 934

(56) References Cited

U.S. PATENT DOCUMENTS 4,045,391 A   8/1977   Buschfeld

FOREIGN PATENT DOCUMENTS

| EP | 0447360 A2 | 3/1991 |
| EP | 0634434 A2 | 7/1994 |
| EP | 0720997 A2 | 1/1996 |
| WO | WO 96/11238 | 4/1996 |
| WO | WO 98/24828 | 6/1998 |
| WO | WO 98/42768 | 10/1998 |
| WO | WO 99/23661 | 5/1999 |
| WO | WO 99/51659 | 10/1999 |

OTHER PUBLICATIONS

Usasiri Samaraweera et al., "Enhanced Reactivity of Melamine–Formaldehyde Resins by Fractionation. Crosslinking at Ambient Temperature," Journal of Applied Polymer Science, U.S. John Wiley and Sons Inc., New York, vol. 45, No. 11, 15–8–92, Mar. 19, 2001.
Database Chemabs Online, Chemical Abstracts Service, Columbus, Ohio, US, JP 04–088096A, Mar. 19, 1992, Mar. 19, 2001.
Database Chemabs Online, Chemical Abstracts Service, Columbus, Ohio, US, JP 08–165452A, Jun. 25, 1996, Mar. 19, 2001.
Waterborne, Higher Solids and Powder Coatings Symposium, Feb. 5–7, 1997, New Orleans, LA, USA, "New Two–Component Powder Coating Binders: Polyester Acrylate Hybrid as TGIC Cure Alternative," T. Agawa and E. D. Dumain, pp. 342–353.
International Search Report of Mar. 19, 2001.

Primary Examiner—Samuel A. Acquah

(57) ABSTRACT

Carboxyl functional polyester resins obtainable by reaction of:
a) at least a compound of the formula

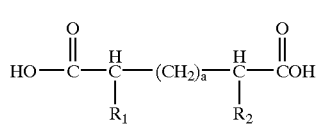

I wherein $a \geq 1$, and wherein $R_1$ and $R_2$ each may represent an alkyl group having from 1 to 4 carbon atoms or wherein $R_1$ and $R_2$ may form together with the group —CH—$(CH_2)_x$—CH~ a cycloalkyl group and preferably 1,4-cyclohexane dicarboxylic acid ($A_1$), mixed with smaller molar amounts of monoglycidyl esters of α,α-branched carboxyl acids containing from 5 to 19 carbon atoms in the acid moiety ($A_2$), and
b) at least one compound B comprising one primary- or secondary hydroxyl group and one tertiary aliphatic carboxyl group, and
c) optionally one diol compound C, and
d) optionally a dihydroxymonocarboxylic acid compound D, and
e) optionally a trihydroxyalkane ($E_1$) or tetrahydroxyalkane ($E_2$), the molar ratio of compounds $A_1$:(C+$A_2$):B:D:$E_1$:$E_2$, being, (X+Y+1):Y:2:X:Q:P, wherein X ranges from 0 to 8, Y ranges from 1 to 8, Q ranges from 0 to 3 and wherein P ranges from 0 to 3, at a temperature of from 100 to 240° C., until essentially all the hydroxyl groups as initially present in the reaction mixture have been reacted; and the glycidyl functional polyester resins derived therefrom.

18 Claims, No Drawings

ACID FUNCTIONAL AND EPOXY FUNCTIONAL POLYESTER RESINS

FIELD OF THE INVENTION

The present invention relates to carboxyl functional polyester resins, to a process for the preparation of the resins, to polyglycidylester resins obtainable by glycidating said carboxyl functional polyester resins, to coating compositions, and in particular powder coating compositions or liquid coating compositions comprising said carboxyl functional polyester resins or said polyglycidylester resins, and to cured products obtained by using the indicated coating compositions.

BACKGROUND OF THE INVENTION

Powder coating compositions based on the solid reaction products of 2,2-bis-(4-hydroxyphenyl)propane and epichlorohydrin are known already for a long time. The cured products prepared on the basis of these compositions are resistant against hydrolysis, however, they show a low ultraviolet resistance and are therefore not suitable for applications requiring a high degree of outdoor durability such as building parts or automotive topcoats.

Triglycidylesters which can be used in good quality outdoor durable coatings and in moulding compositions are disclosed in European Patent Application No. 447360A (EP-A-447,360). Due to the anhydride half ester nature of the terminal carboxyl functions present in the tricarboxylic acid adduct precursors, strong alkaline conditions should be avoided during glycidation of these tricarboxylic acid adducts to avoid hydrolysis of the glycidylester formed and/or hydrolysis of one or more ester groups in the resin backbone. As a result thereof the triglycidylester produced will contain a relatively high level of hydrolizable chlorine and/or will contain low molecular weight hydrolysis products which might cause toxicity problems, as may be derived from "Water based coatings with excellent saponification stability XIIIth Int. Conf. 1987, Athens, Greece, p. 175.

The high level of hydrolizable chlorine is reflected in example 2 of EP-A-447,360 which relates to the glycidation of the 2:1 adduct of hexahydrophthalic anhydride and dimethylolpropionic acid. The product obtained has a chlorine content of 1.5%. Such a high level of residual chlorine is generally undesirable in coating compositions. In addition, due to the fact that the triglycidylesters reported in EP-A-447,360 are liquid, they can not be applied in powder coating compositions.

In e.g. International Application WO 96/11238, it was taught to a person skilled in the art of this specific area of curable coatings, that epoxy resins containing cycloaliphatic nuclei had the disadvantage that they could only provide brittle coating films when cured. This brittleness made them unsuitable for coating applications, as brittleness often led to poor adhesion.

From European patent application No. 0634434A2 was known a process for the preparation of linear tertiary aliphatic carboxyl functional polyester resins, by reacting:
(a) at least one compound A' comprising one monofunctional primary- or secondary hydroxyl group and/or at least one compound A" comprising one primary- or secondary hydroxyl group and one tertiary aliphatic carboxyl group;
(b) at least one aromatic or cycloaliphatic dicarboxylic acid compound B comprising two aromatic- or secondary aliphatic carboxyl groups or the anhydride thereof;
(c) at least one diol compound C comprising two aliphatic hydroxyl groups, which may independently be a primary or a secondary hydroxyl group; and
(d) at least one dihydroxymonocarboxylic acid compound D comprising a tertiary aliphatic carboxyl group and two aliphatic hydroxyl groups, which may each independently be primary or secondary hydroxyl, the molar ratio of compounds A':A":B:C:D being

M:N:X+Y+1:X:Y wherein M+N=2, X ranges from 2 to 8 and Y ranges from 2-N to 8, at a temperature of from 100 to 240° C., until essentially all the non-tertiary carboxyl groups as initially present in the reaction mixture have been reacted.

Moreover in this application were disclosed polyglycidylester resins obtainable by reacting said linear tertiary aliphatic carboxyl functional polyesters with an excess epihalohydrin in the presence of a suitable base and optional catalyst. Preferably, the polyesters were reacted with epichlorohydrin. Both the specified linear polyesters and the corresponding polyglycidylesters derived therefrom were used with a cross-linking agent for powder coating compositions.

From the European patent application No. 0720997A2, linear tertiary carboxyl functional polyesters and epoxy functional polyester resins were known. These polyester resins were obtainable by reaction of:
a) at least one aromatic and/or cycloaliphatic carboxylic acid compound A comprising two aromatic- and/or secondary aliphatic carboxyl groups or the anhydride thereof,
b) at least one hydroxyl compound B comprising two aliphatic hydroxyl groups, which groups each independently may be primary or secondary hydroxyl groups,
c) at least one hydroxyl substituted carboxylic acid compound C comprising at least one tertiary aliphatic carboxyl group and two aliphatic hydroxyl groups, which groups each independently may be primary or secondary hydroxyl groups, and
d) optionally one carboxylic acid compound D comprising one carboxyl group, the molar ratio of compounds A:B:C:D being (X+Y−1):X:Y:Z, wherein X ranges from 2 to 8, Y ranges from 2 to 8, and Z ranges from 0 to 2.

These polyester resins could be used together with a suitable curing agent for the production of powder coatings, or could be converted into the corresponding glycidylesters, which in combination with a suitable curing agent could be used for the production of powder coatings.

From WO 98/42768 have become known carboxyl functional polyester resins, epoxy functional polyester resins derived from them, and coating compositions comprising these polyester compounds.

The carboxyl functional polyester resins are obtainable by reaction of:
a) at least a compound of the formula:

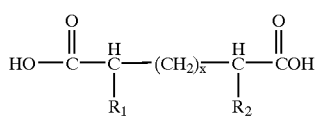

wherein $x \geq 1$ wherein $R_1$ and $R_2$ each may represent an alkyl group having from 1 to 4 carbon atoms or wherein $R_1$ and $R_2$ may form together with the group $-CH-(CH_2)_x-$ CH~ a cycloalkyl group and preferably 1,4-cyclohexane dicarboxylic acid ($A_1$), optionally mixed with minor amounts of a corresponding compound of formula I, wherein x=0 or anhydride thereof ($A_2$), b) at least one diol compound B comprising two aliphatic hydroxyl groups which may each independently be a primary or a secondary hydroxyl group;

c) optionally a dihydroxymonocarboxylic acid compound C, comprising a tertiary aliphatic carboxyl group and two aliphatic hydroxyl groups, which may each independently be primary or secondary hydroxyl; and d) optionally a trihydroxyalkane (D1) or tetrahydroxyalkane (D2), the molar ratio of compounds ($A_1+A_2$):B:C:D1:D2 being X+Y+2Z+3Q+P:X:Y:Z:Q, wherein X ranges from 1 to 8, Y ranges from 0 to 8, Z ranges from 0 to 4 and Q ranges from 0 to 3 and wherein p ranges from 1 to 5, and preferably 1–3 and is most preferably equal to 1, at a temperature of from 100 to 240° C., and preferably from 180 to 210° C. if any compound C is present, until essentially all the hydroxyl groups as initially present in the reaction mixture have been reacted.

Although the linear tertiary aliphatic carboxyl functional polyester resins and the polyglycidylesters thereof enabled a certain progress as to the requirements of excellent outdoor durability (UV stability) and resistance against hydrolysis in the cured state, with reference to their use in modern economically applied powder coatings, there is still a need for further improvement of this combination of properties.

On the other hand novel powder coating binders for the exterior durable powder coating market derived from carboxylated polyester resins, cured with epoxy functional acrylate polymers, have been proposed during the Waterborne, Higher Solids and Powder Coatings Symposium, Feb. 5–7, 1997, New Orleans La., USA, T Agawa and E D Dumain, p. 342–353, "New Two-component Powder Coating Binders: Polyester acrylate hybrid as TGIC Cure Alternative.

However, as indicated on page 353 already, further improvements have to be made to provide smoother films, lower cure temperatures and UV durability to rival that of automotive topcoating or outdoor building panel topcoating.

SUMMARY OF THE INVENTION

Therefore, it is an object of the invention to provide, acid functional polyester resins, which can be readily glycidated so as to form a polyglycidylester resin in an efficient way. Said carboxyl functional polyester resin and said polyglycidylester resin show a further improved balance of hardness, flexibility, and/or flow out on curing and excellent outdoor durability in combination with corrosion resistance when applied in coating compositions.

As a result of extensive research and experimentation said carboxyl functional polyester resins have now been surprisingly found.

Accordingly, the invention provides carboxyl functional polyester resins obtainable by reaction of:

a) at least a compound of the formula

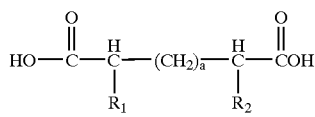

I wherein a≧1 wherein $R_1$ and $R_2$ each may represent an alkyl group having from 1 to 4 carbon atoms or wherein $R_1$ and $R_2$ may form together with the group ~CH—$(CH_2)_a$—CH~ a cycloalkyl group and preferably 1,4-cyclohexane dicarboxylic acid ($A_1$), mixed with smaller molar amounts of monoglycidyl esters of α,α-branched carboxyl acids containing from 5 to 19 carbon atoms in the acid moiety ($A_2$), b) at least one compound B comprising one primary- or secondary hydroxyl group and one tertiary aliphatic carboxyl group, c) optionally one diol compound C comprising two hydroxyl groups which may each independently be a primary or a secondary hydroxyl group and which compounds do not contain aromatic unsaturation;

d) optionally a dihydroxymonocarboxylic acid compound D, comprising a tertiary aliphatic carboxyl group and two aliphatic hydroxyl groups, which may each independently be primary or secondary hydroxyl; and e) optionally a trihydroxyalkane ($E_1$) or tetrahydroxyalkane ($E_2$), the molar ratio of compounds $A_1$:(C+$A_2$):B:D:$E_1$:$E_2$, being, (X+Y+1):Y:2:X:Q:P, wherein X ranges from 0 to 8, Y ranges from 1 to 8, Q ranges from 0 to 3 and wherein P ranges from 0 to 3, at a temperature of from 100 to 240° C., until essentially all the hydroxyl groups as initially present in the reaction mixture have been reacted.

Preferably the temperature of the condensation reaction is in the range of from 180 to 210° C. if any compound D is present.

DETAILED DESCRIPTION OF THE INVENTION

It will be appreciated that an initial reaction product of the components $A_1$ and $A_2$ will result in an adduct, bearing one or two secondary hydroxyl groups which adduct has been found to enable to replace the prior used amounts of diol component partially or completely.

With the term "smaller molar amounts", as used throughout the present specification, is meant that the molar ratio between $A_1$ and $A_2$ is in the range of from 2:1 to 10:1 and preferably in the range of from 2:1 to 8:1 and more preferably in the range of from 4:1 to 6:1.

Preferably carboxyl functional polyester resins are aimed at wherein X is in the range of from 0 to 2, Y is in the range of from 1 to 3, P is in the range from 0 to 2 and Q is in the range from 0 to 2.

It will be appreciated that the aliphatic carboxyl functional polyester resins thus produced may only contain tertiary carboxyl groups pendant of the main chain.

Dependent on the actual presence of components ($E_1$) or ($E_2$) the main chain will be linear (components E are absent) or branched (component $E_1$ and/or $E_2$ is present).

It will be appreciated by those skilled in the art that the molecular weight distribution and number average molecular weight of the resin produced will depend on the specific reactants and the ratios applied in the process of the invention. Number average molecular weights of the resins obtained are in the range of from 500 to 10000 and referably from 2000 to 7000.

Whilst the tertiary aliphatic carboxyl groups optionally present in compounds C practically do not react under the esterification conditions employed, glycidation of these non-terminal tertiary aliphatic carboxyl groups and the terminal secondary carboxyl groups with epihalohydrin can be performed under standard alkaline conditions, whereby a polyglycidylester resin can be obtained which contains a low hydrolizable halogen content, usually lower than 1% by weight and preferably lower than 0.7% by weight, based on the total weight of the composition.

It will be appreciated that other aspects of the present invention are formed by polyglycidylesters of the hereinbefore specified carboxyl functional polyesters and by coating compositions and more in particular powder coating compositions or liquid coatings, comprising said carboxyl functional polyester resins and/or said polyglycidylesters derived therefrom and by cured products, obtained by using these coating compositions.

The process for preparation of the aliphatic carboxyl functional polyester may in general be carried out according to conventional esterification methods, preferably by azeotropic condensation, taking care that the terminal secondary carboxyl groups are only originating from 1,4-cyclohexane dicarboxylic acid. In particular, the condensation is carried out by charging the compounds $A_1$ and $A_2$ and thereafter the components C, if any, and B, D and E, if any, to the reactor, whereafter the temperature is increased from room temperature to a temperature in the range of from 180 to 240° C., preferably from 180 to 210° C. in the presence of any compound B, during a period of 3 to 8 hours, thus allowing the reaction to initiate and to proceed under continuous azeotropic removal of water. Generally the azeotropic removal of water is being continued until at least 90% of the original hydroxyl groups have reached and more preferably at least 95% of the original hydroxyl groups have reacted. An esterification catalyst known in the art, such as for example dibutyltinoxide, paratoluenesulphonic acid, tinoctoate, zincoctoate and lithium ricinoleate may be used in the esterification process, but is in general not required.

As preferred components $A_2$ are used monoglycidyl esters of an alpha-branched carboxylic acid of the formula:

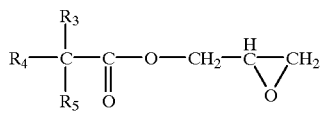

wherein $R_3$, $R_4$ and $R_5$ are alkyl groups, having together from 5 to 13 carbon atoms, and preferably from 9 to 11 carbon atoms.

More preferably the component $A_2$ comprises CARDURA E10 monoglycidyl esters (CARDURA is a trade mark).

Suitable compounds A, for use in the process of the present invention are difunctional acids, for example dodecanedioic acid, cyclobutanedicarboxylic acid, suberic acid, succinic acid, glutaric acid, azelaic acid, 1,4-cyclohexanedicarboxylic acid and 1,3-cyclohexanedicarboxylic acid or combinations thereof; of which the cyclohexanedicarboxylic acids being preferred and 1,4-cyclohexane dicarboxylic acid being the most preferred.

Suitable compounds B are formed by aliphatic and cycloaliphatic alcohols having one primary or one secondary hydroxyl group and having from 1 to 6 carbon atoms and having in addition one tertiary carboxyl group, e.g. cyclohexane-1-methyl-4-hydroxy carboxylic acid, the 1:1 molar ratio reaction product of dimethylol propionic acid and cyclohexane carboxylic acid and hydroxypivalic acid, of which the latter is preferred.

Suitable compounds C for use in the process of the present invention include branched aliphatic-, cycloaliphatic-, or araliphatic compounds, containing two aliphatic hydroxyl groups, each individually being either a primary or a secondary hydroxyl group, such as for example propylene glycol, neopentyl glycol, hydrogenated diphenylolpropane (HDPP), hydrogenated 4,4'-dihydroxy-diphenyl, 1,4-cyclohexanedimethylol, 1,4-dihydroxy-cyclohexane, hydroxypivalylhydroxypivalate and 2-butyl-2-ethyl-1,3-propanediol or mixtures thereof; of which HDPP is particularly preferred.

A typical example of a suitable compound D for use in the process of the present invention is dimethylol propionic acid.

A typical and preferred example of compound $E_1$ to be used for the preparation of the branched carboxyl functional polyesters of the present invention, is trimethylol propane and a preferred example of compound $E_2$ is pentaerythritol.

As indicated above the aliphatic carboxyl functional polyester resin obtainable according to the process of the present invention can be easily converted to a polyglycidylester resin according to methods known in the art i.e. by reaction with an excess epihalohydrin in the presence of a suitable base and optionally a catalyst. Most conveniently epichlorohydrin is used.

It has surprisingly been found now, that due to the specific molecular structure of the initially prepared carboxyl functional polyester resin, an improved phase separation was obtained during the subsequent glycidation reaction which can easily be performed without the earlier noticed waxy appearance and which was found to result in a significant lower hydrolysable halogen, e.g. chlorine, in the obtained epoxy functional polyester resin, e.g. hydrolysable chlorine less than 8000 mg/kg. Moreover these molecular microstructures of the backbones have been found to provide, when incorporated in coating compositions, an excellent combination of the outdoor durability, corrosion resistance (in particular of coatings applied directly on untreated metal surfaces and due to the lower hydrolysable halogen), hydrolysis resistance, improved flow out under curing conditions and improved pigment wettability, good hardness and flexibility of the cured coating film. Further on, the cured film shows a nice glossy appearance.

It will be appreciated that the hydrolysis resistance of the coatings, comprising components with the specific polyester structure, is of particular importance with reference to the use of the resins for in water soluble cationic or anionic eletrodeposition resin systems.

Moreover for the specific polyester resins structure less expensive ingredients (e.g. CARDURA esters) are used to replace partially or completely the more expensive diol component, which enables a cost saving.

It was found that those polyglycidylester resins derived from the carboxyl functional polyester resins of the invention wherein Y ranges from 1 to 2, X simultaneously ranges from 0 to 1, P ranges 0 to 2 and Q ranges 0 to 2, can provide the most preferred compositions, which combine excellent outdoor durability and excellent corrosion resistance (due to the low hydrolysable halogen content). More preferably polyglycidylester resins are used wherein X=0, Y=1.5, P=0, Q=0.

The curable coating compositions of the invention may be prepared by addition of a cross-linking resin to either the hereinbefore specified carboxyl functional polyester resins of the present invention or to the polyglycidylester resin obtainable by glycidating said carboxyl functional polyester resin.

The amount of cross-linking compound used in the coating compositions of the invention will normally be such so as to provide about equal amounts of reactive groups of the cross-linking compound and of the carboxyl groups present in the carboxyl functional polyester resin or of the epoxy groups present in the polyglycidylester resin.

Suitable cross-linking resins for use in combination with the carboxyl functional polyester resins of the present invention are for example outdoor durable epoxy resins, such as for example the polyglycidylester resins according to the present invention, the diglycidylesters of alpha, alpha'-dibranched dicarboxylic acids as disclosed in European Patent Application publication number 518,408 and the polyglycidylesters based on polycarboxylic acids carrying two alkyl substituents on each of the alpha carbon atoms as disclosed in European patent application publication number 366,205.

Suitable cross-linking resins for use in combination with the polyglycidylester resins of the present invention are for example the (corresponding) acid functional polyester resin of the present invention; solid polyacids such as sebacic acid, 1,12-dodecanedioic acid; anhydrides such as polyazeleic polyanhydride; acid functional polyesters such as the reaction product of one mole of trimethylolpropane and 3 moles of hexahydrophthalic anhydride, the reaction product of 1,6-hexanediol with a molar excess of 1,12-dodecanedioic acid, the reaction product of 4 moles 1,10-decanedicarboxylic acid, 1.49 mols hexanediol, 0.47 mols 1,1,1-tris-(hydroxy-methyl)-propane and 0.27 mols pentaerythritol, the reaction product of 4 mols 1,10-decanedicarboxylic acid, 1.2 mols hexanediol, 0.45 mols trimethylolpropane, 0.29 mols pentaerythritol and 0.21 mols dimethylolpropionic acid and the reaction product of one mole of hexamethoxymethylmelamine and 3 moles of hydroxypivalic acid and amine-type curing agents.

Most preferred are combinations of the carboxyl functional polyester resins and the polyglycidylesters derived therefrom.

The coating compositions of the present invention may further comprise a catalyst and optionally other additives, as known in the art to be suitable for use in coating compositions.

Suitable catalysts are for example quaternary ammonium and phosphonium salts; metal salts/compounds such as for example stannous(II)octoate; basic compounds such as for example the imidazoles; and tertiary amines such as for example diazabicycloundecene.

The amount of catalyst used will usually be somewhere in the range of from 0.1 to 2% by weight based on the weight of the total coating composition.

Suitable cure times and cure temperatures of the coating compositions of the invention are those conventionally applied in connection with coating systems.

It will be appreciated that another aspect of the present invention is formed by a process for the preparation of the carboxyl functional polyesters as specified hereinbefore.

Accordingly the invention relates to a process comprising mixing and reacting a) at least a compound of the formula

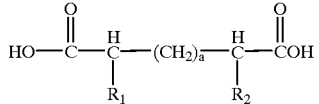

wherein a≧1 wherein in R1 and R2 each may represent an alkyl group having from 1 to 4 carbon atoms or wherein R1 and R2 may form together with the group ~CH—(CH$_2$)$_a$—CH~ a cycloalkyl group and preferably 1,4-cyclohexane dicarboxylic acid (A$_1$), mixed with smaller molar amounts of monoglycidyl esters of α,α-branched carboxyl acids containing from 5 to 19 carbon atoms in the acid moiety (A$_2$), followed by simultaneous or stepwise addition of b) at least one compound B comprising one primary- or secondary hydroxyl group and one tertiary aliphatic carboxyl group, c) optionally one diol compound C comprising two hydroxyl groups which may each independently by a primary or a secondary hydroxyl group and which compounds do not contain aromatic unsaturation;

d) optionally a dihydroxymonocarboxylic acid compound D, comprising a tertiary aliphatic carboxyl group and two aliphatic hydroxyl groups, which may each independently be primary or secondary hydroxyl; and e) optionally a trihydroxyalkane (E$_1$) or tetrahydroxyalkane (E$_2$), the molar ratio of compounds A$_1$(C+A$_2$):B:D:E$_1$:E$_2$, being (x+y+1):y:2:x:Q:P, wherein X ranges from 0 to 8, Y ranges from 1 to 8, Q ranges from 0 to 3 and wherein P ranges from 0 to 3, at a temperature of from 100 to 240° C., until essentially all the hydroxyl groups as initially present in the reaction mixture have been reacted.

Preferably the temperature of the condensation reaction is in the range of from 180 to 210° C. if any compound D is present.

It will be appreciated that due to this process, using specific starting ingredients, a hydrolysable halogen content can be reached which is significant lower than those obtained according to the prior art, which in its turn results in improved corrosion resistance and in particular when the coating has direct contact on metal surfaces.

Moreover the present invention also relates to the intermediate product, obtained in the first reaction step of the hereinbefore specified process, i.e. the reaction product of the components A$_1$ and A$_2$, comprising at least one compound of the formulae:

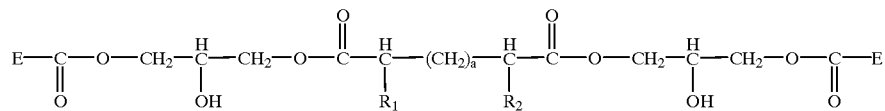

wherein E is a branched alkyl residue having from 5 to 19 carbon atoms and preferably from 5 to 11 carbon atoms, and/or a compound of the formula

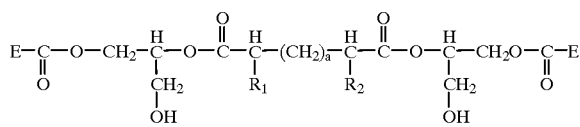

and/or a compound of the formula

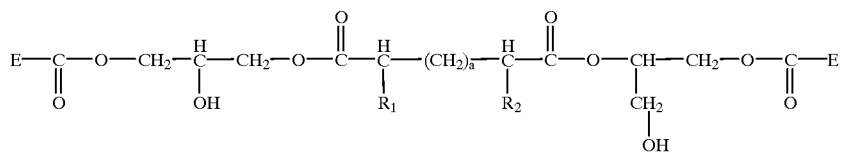

and/or a compound of the formula

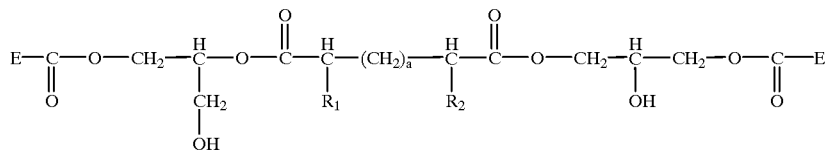

and/or compound of the formula

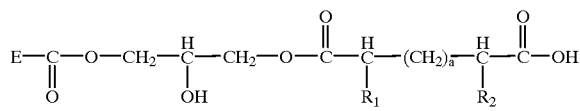

and/or a compound of the formula

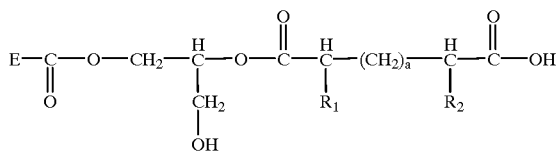

or mixtures thereof, said compound being mixed with the starting dicarboxylic acid $A_1$.

The invention is illustrated by the following examples, however without restricting its scope to these specific embodiment.

EXAMPLE 1

Preparation of linear aliphatic carboxyl functional polyesters according to the invention (Pe2 and Pe3).

The respective components of both polyester resins were charged in molar amounts as indicated in Table 1 in a roundbottom glass reactor, equipped with a Dean and Stark separator, temperature control, nitrogen inlet and stirrer.

The mixture was then heated to 150° C. until essentially all epoxy groups initially present have reacted. The temperature of the reaction mixture was than gradually increased 210° C. and the formed water was removed from the mixture via the Dean and Stark trap. The mixture was kept at 210° C. until essentially all the hydroxylgroups initially present have reacted. The acid functional polyester thus formed was discharged and allowed to cool down to room temperature.

EXAMPLE 2

Preparation of the comparative linear aliphatic functional polyester (Pe 1).

The respective components of this polyester resin were charged in molar amounts as indicated in Table 1 in a roundbottom glass reactor, equipped with a Dean and Stark separator, temperature control, nitrogen inlet and stirrer. The mixture was then heated to 150° C. The formed water was removed from the mixture via the Dean and Stark trap. The temperature of the reaction mixture was increased gradually to 210° C. and kept at 210° C. until essentially all the hydroxylgroups initially present have reacted. The acid functional polyester thus formed was discharged and allowed to cool down to room temperature.

TABLE 1

| Linear acid functional polyester resin | Pe 1 | Pe 2 | Pe 3 |
|---|---|---|---|
| HPA | 2 | 2 | 2 |
| 1,4 CHDA | 2 | 2 | 2 |
| HDPP | 1 | 0.75 | — |
| CE-10 | — | 0.25 | 1 |

HDPP: hydrogenated diphenylolpropane
HPA: hydroxypivalic acid
1,4 CHDA: 1,4-cyclohexanedicarboxylic acid
CE-10: CARDURA E10 glycidylester

EXAMPLE 3

An amount equalling 1 carboxyl group equivalent of a functional polyester was dissolved in 8 moles epichlorohydrin (ECH) and isopropylalcohol (IPA) and water. The solution was charged to a 3 litre glass reactor equipped with a temperature control, stirrer and reflux condenser. Next, the temperature was raised to 75–85° C., followed by the first gradual addition of an aqueous solution of 0.17 moles NaOH over a period of time of 20 minutes. After an additional reaction period of 50 minutes the reactor content was cooled to 55° C. in 30 minutes, followed by the second gradual addition of an aqueous solution of 0.94 moles NaOH over a period of time of 60 minutes. After an additional reaction period of 5 minutes the reactor content was allowed to settle and the aqueous phase was separated from the organic phase.

The organic phase was vacuum flashed to remove the water, IPA and ECH.

The resulting product was dissolved in methyl-isobutylketone and the organic phase was washed four times with water whereafter the organic phase was vacuum flashed to remove methyl-isobutylketone. The glycidylester thus obtained was discharged and allowed to cool down. Characteristics of the polyglycidylester resins prepared are presented in Table 2.

TABLE 2

| Epoxy funct. polyester | Acid Value eq/kg | Carb. funct. polyester precursor | CE-10% | EGC mmol/kg | Epoxy yield | Hydrolysable chlorine mg/kg | Appearance | Total chlorine |
|---|---|---|---|---|---|---|---|---|
| A | 2.70 | Pe 1 | 0 | 1891 | 80% | 13713 | white, waxy | 15600 |
| B | 2.79 | Pe 2 | 25 | 2058 | 86% | 7117 | white, waxy | 9894 |
| C | 2.43 | Pe 3 | 100 | 1879 | 80% | 7562 | clear liquid | 10450 |

What we claim is:

1. Carboxyl functional polyester resins comprising the reaction product of:

a) an acid moeity comprising an $A_1$ compound represented by the formula:

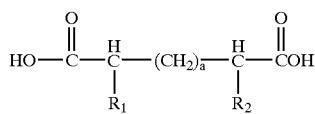

I wherein $a \geq 1$, $R_1$ and $R_2$ each may represent an alkyl group having from 1 to 4 carbon atoms or wherein $R_1$ and $R_2$ may form, together with the group —CH—$(CH_2)_a$—CH—, a cycloalkyl group, and mixed with smaller molar amounts of $A_2$ monoglycidyl esters of $\alpha,\alpha$-branched carboxyl acids containing from 5 to 19 carbon atoms in the acid moiety, b) a compound B comprising one primary- or secondary hydroxyl group and one tertiary aliphatic carboxyl group, c) optionally one diol compound C comprising two hydroxyl groups which may each independently be a primary or a secondary hydroxyl group and which compounds do not contain aromatic unsaturation;

d) optionally a dihydroxymonocarboxylic acid compound D, comprising a tertiary aliphatic carboxyl group and two aliphatic hydroxyl groups, which may each independently be primary or secondary hydroxyl; and e) optionally a trihydroxyalkane ($E_1$) or tetrahydroxyalkane ($E_2$), the molar ratio of compounds $A_1$:(C+$A_2$):B:D:$E_1$:$E_2$ corresponding to (X+Y+1):Y:2:X:Q:P, wherein X ranges from 0 to 8, Y ranges from 1 to 8, Q ranges from 0 to 3 and wherein P ranges from 0 to 3, said reaction proceeding at a temperature of from 100 to 240° C. until essentially all the hydroxyl groups as initially present in the reaction mixture have been reacted.

2. Carboxyl functional polyester resins according to claim 1, characterized in that the molar ratio between the components $A_1$ and $A_2$ is in the range of from 2:1 to 10:1.

3. Carboxyl functional polyester resins according to claim 1, characterized in that X is in the range of from 0 to 2, Y is in the range of from 1 to 3, P is in the range of from 0 to 2 and Q is in the range from 0 to 2.

4. Carboxyl functional polyester resins according to claim 1, characterized in that X=0, Y=1.5, P=0 and Q=0.

5. Carboxyl functional polyester resins according to claim 1, characterized in that components $A_2$ are monoglycidyl esters of carboxylic acids of the formula:

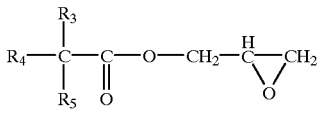

wherein $R_3$, $R_4$ and $R_5$ are alkyl groups, having together from 5 to 13 carbon atoms.

6. Carboxy functional polyester resins according to claim 5, wherein $R_3$, $R_4$ and $R_5$ are alkyl groups, having together from 9 to 11 carbon atoms.

7. Glycidylester functional polyester resin obtained by reacting the carboxyl functional polyester resins according to claim 1, with an excess epihalohydrin, in the presence of a suitable base and optionally a catalyst.

8. A coating composition comprising a linear or branched aliphatic carboxyl functional polyester resins claimed in claim 1 and a cross-linking agent.

9. A coating composition comprising a polyglycidyl ester resin of claim 7 and a cross-linking agent.

10. A coating composition according to claim 9, characterized in that the cross-linking agent is a carboxyl functional polyester resin according to claim 1.

11. Carboxy functional polyester resins according to claim 1, wherein $A_1$ comprises 1,4-cyclohexane dicarboxylic acid.

12. Glycidylester functional polyester resin obtained by reacting the carboxyl functional polyester resins according to claim 11, with an excess epihalohydrin, in the presence of a suitable base and optionally a catalyst.

13. Glycidylester functional polyester resin obtained by reacting the carboxyl functional polyester resins according to claim 4, with an excess epihalohydrin, in the presence of a suitable base and optionally a catalyst.

14. Glycidylester functional polyester resin obtained by reacting the carboxyl functional polyester resins according to claim 5, with an excess epihalohydrin, in the presence of a suitable base and optionally a catalyst.

15. Adducts of any of the formulae:

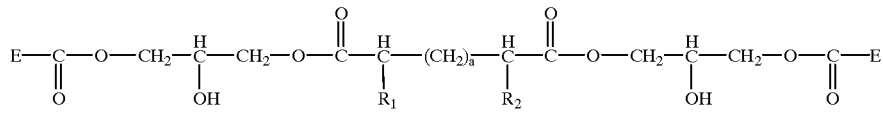

wherein E is a branched alkyl residue having from 5 to 19 carbon atoms, and/or a compound of the formula

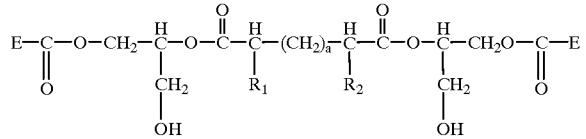

and/or a compound of the formula

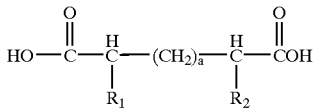

wherein $a \geq 1$, $R_1$ and $R_2$ each may represent an alkyl group having from 1 to 4 carbon atoms or wherein $R_1$ and $R_2$ may form, together with the group —CH—$(CH_2)_a$—CH—, a cycloalkyl group.

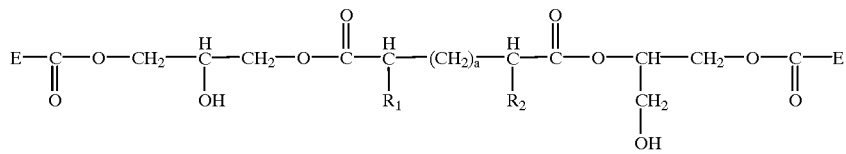

and/or a compound of the formula

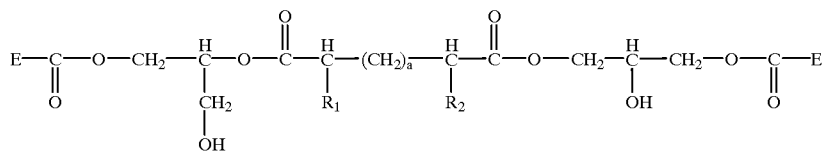

and/or compound of the formula

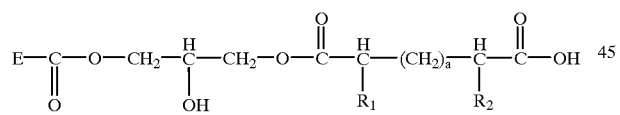

and/or a compound of the formula

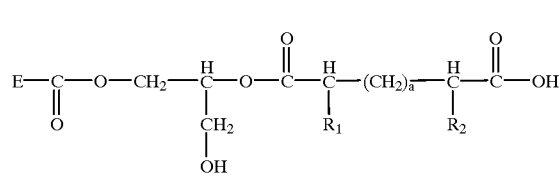

or mixtures thereof, said adduct(s) being mixed with a starting dicarboxylic acid comprising an $A_1$ compound represented by the formula:

16. Intermediate adducts of claim 15, characterized in that X=2, and the group

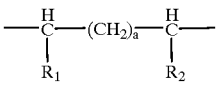

forms cyclohexane.

17. A process for the preparation of carboxyl functional polyesters, comprising mixing and reacting a) at least a compound of the formula

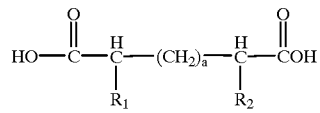

wherein $a \geq 1$ wherein in $R_1$ and $R_2$ each may represent an alkyl group having from 1 to 4 carbon atoms or wherein R1 and R2 may form together, with the group —CH—$(CH_2)_a$—CH—, a cycloalkyl group, mixed with smaller molar amounts of monoglycidyl esters of α,α-branched carboxyl acids containing from 5 to 19 carbon atoms in the acid moiety ($A_2$), followed by simultaneous or stepwise addition of b) at least one compound B comprising one primary- or secondary hydroxyl group and one tertiary aliphatic carboxyl group,
c) optionally one diol compound C comprising two hydroxyl groups which may each independently by a primary or a secondary hydroxyl group and which compounds do not contain aromatic unsaturation;
d) optionally a dihydroxymonocarboxylic acid compound D, comprising a tertiary aliphatic carboxyl group and two aliphatic hydroxyl groups, which may each independently be primary or secondary hydroxyl; and
e) optionally a trihydroxyalkane ($E_1$) or tetrahydroxyalkane ($E_2$), the molar ratio of compounds $A_1(C+A_2)$:B:D:$E_1$:$E_2$, being (x+y+1):y:2:x:Q:P, wherein X ranges from 0 to 8, Y ranges from 1 to 8, Q ranges from 0 to 3 and wherein P ranges from 0 to 3, at a temperature of from 100 to 240° C., until essentially all the hydroxyl groups as initially present in the reaction mixture have been reacted.

18. Adducts according to claim 15 wherein E is a branched alkyl residue having from 9 to 11 carbon atoms.

* * * * *